(12) United States Patent  
Zuehlke et al.

(10) Patent No.: US 7,816,626 B2
(45) Date of Patent: Oct. 19, 2010

(54) METHOD AND APPARATUS FOR SEVERING DISKS OF BRITTLE MATERIAL, IN PARTICULAR WAFERS

(75) Inventors: Hans-Ulrich Zuehlke, Jena (DE); Jan Grieger, Jena (DE); Gabriele Eberhardt, Jena (DE)

(73) Assignee: JENOPTIK Automatisierungstechnik GmbH, Jena (DE)

( * ) Notice: Subject to any disclaimer, the term of this patent is extended or adjusted under 35 U.S.C. 154(b) by 430 days.

(21) Appl. No.: 11/612,731

(22) Filed: Dec. 19, 2006

(65) Prior Publication Data

US 2007/0138155 A1    Jun. 21, 2007

(30) Foreign Application Priority Data

Dec. 21, 2005   (DE) .................. 10 2005 062 230

(51) Int. Cl.
*B23K 15/00* (2006.01)
(52) U.S. Cl. ............... 219/121.72; 219/121.6; 219/121.67; 219/121.68; 219/121.69; 219/121.84
(58) Field of Classification Search ........... 219/121.72, 219/121.67
See application file for complete search history.

(56) References Cited

U.S. PATENT DOCUMENTS

| | | | |
|---|---|---|---|
| 5,254,833 A | 10/1993 | Okiyama | |
| 5,968,382 A * | 10/1999 | Matsumoto et al. | 219/121.72 |
| 6,676,878 B2 | 1/2004 | O'Brien et al. | |
| 6,756,562 B1 * | 6/2004 | Kurosawa et al. | 219/121.67 |
| 2004/0188400 A1 * | 9/2004 | Peng et al. | 219/121.72 |
| 2005/0023260 A1 | 2/2005 | Takyu et al. | |
| 2005/0029239 A1 * | 2/2005 | Matsumoto et al. | 219/121.72 |

FOREIGN PATENT DOCUMENTS

| | | |
|---|---|---|
| DE | 693 04 194 | 1/1997 |
| DE | 198 56 346 | 6/2000 |
| DE | 100 16 628 | 10/2001 |
| DE | 102 35 234 | 8/2002 |
| DE | 696 29 704 | 7/2003 |
| DE | 103 17 115 | 7/2004 |
| DE | 10 2004 014 276 | 10/2005 |
| EP | 1 570 941 | 2/2005 |
| JP | 2001144037 | 5/2001 |

(Continued)

OTHER PUBLICATIONS

Machine Translation of JP-2004-025187.*

(Continued)

*Primary Examiner*—Tu B Hoang
*Assistant Examiner*—Brian Jennison
(74) *Attorney, Agent, or Firm*—Frommer Lawrence & Haug LLP

(57) ABSTRACT

The invention is directed to a method in which disks, particularly wafers, of brittle material are severed along planned severing lines by a laser by introducing thermal stresses. The temperature gradient required for this and the compressive stresses and tensile stresses resulting from it are generated in that the disk is first cooled proceeding from its underside at least along the planned severing lines toward the upper side of the disk, and the upper side of the disk is then acted upon by a laser beam along the planned severing lines. The description also relates to an apparatus for carrying out the method.

14 Claims, 1 Drawing Sheet

FOREIGN PATENT DOCUMENTS

| | | |
|---|---|---|
| JP | 2004025187 | 1/2004 |
| JP | 2004066341 | 3/2004 |
| WO | 03/018276 | 6/2003 |

OTHER PUBLICATIONS

Machine Translation of DE 102 35 234.*

Patent Abstracts of Japan, Publication No. 08025064 published Jan. 30, 1996 Method and Device for Laser Working, Sony Corp.
Patent Abstracts of Japan, Publication No. 20000154467 published Jan. 18, 2000 Working Method of Workpiece by Beam and Its Working Device, Shin Meiwa Ind Co Ltd.
Patent Abstracts of Japan, Publication No. 2003088980 published Mar. 25, 2003 Laser Beam Machining Method, Hamamatsu Photonics KK.

* cited by examiner

METHOD AND APPARATUS FOR SEVERING DISKS OF BRITTLE MATERIAL, IN PARTICULAR WAFERS

CROSS-REFERENCE TO RELATED APPLICATION

This application claims priority of German Application No. 10 2005 062 230.5, filed Dec. 21, 2005, the complete disclosure of which is hereby incorporated by reference.

BACKGROUND OF THE INVENTION a) Field of the Invention

The present invention relates to a method and apparatus for severing disks of brittle material, such as wafers.

b) Description of the Related Art

It is known to sever disks made of a brittle material such as glass, ceramic, silicon, quartz, gallium arsenide or sapphire by means of a laser through induced thermal stresses.

For this purpose it is essential that the severing edge is formed exactly along the planned lines (referred to hereinafter as the precision of the severing line) and that the stress field caused by a sufficiently high temperature gradient is localized as precisely as possible on the planned severing edge.

DE 693 04 194 T2 discloses a method of the type mentioned above in which a beam bundle is moved on the surface along a desired severing line relative to the workpiece followed by a jet of coolant (water-air mixture) which is directed in a narrowly localized manner on a point of the heated severing line at a distance from the point of impingement of the beam bundle.

As is fundamental in all of the methods in which stresses are induced by means of laser radiation leading to the formation of cracks, the energy of the beam bundle is controlled in such a way that while taking into account the relevant method parameters and workpiece parameters the volume in the surface region of the workpiece is heated to a temperature below the softening point of the material in order to generate high compressive stresses in the volume.

In order to achieve a high energy input at high speed, it is suggested that the beam spot of the beam bundle is elliptical, which already shows the realization that a significant narrowing of the heating zone transverse to the cutting direction increases the cutting precision.

At the same time, it was realized that a minimum width of the beam spot is necessary to cause the required compressive stresses due to the limited action period and the length of the beam spot.

The optimal value indicated for the transverse dimension is 0.2 times to 2.0 times the thickness of the material.

The cross section of the coolant jet is not mentioned in DE 693 04 194 T2. According to the invention, a coolant jet of this kind has a diameter of 1 to 2 mm².

According to an embodiment example in DE 693 04 194 T2, the method described therein can be used to cut disks having a diameter of 31.2 mm, e.g., from sheet glass having a thickness of 1.2 mm.

Practical trials have shown that the precision of the severing edges that can be achieved with this method when severing a disk in very narrow strips or chips, e.g., less than 500 μm, is insufficient.

The extract from WO 03/018276 A1 likewise discloses a method for severing brittle material in which a laser beam is moved relatively along a planned severing line on the surface of a workpiece. At the same time, the entire surface is covered by a coolant film in which a hole is generated at the respective point of impingement of the laser beam by means of a gas flow. The spray position of the gas must likewise be moved along the severing line corresponding to the laser beam.

In contrast to DE 693 04 194 T2, tensile stresses are initially generated at the surface, not in a localized manner but so as to be homogeneously distributed over the entire surface of the workpiece, by cooling the entire surface during the laser irradiation. The severing crack is formed immediately by the application of laser radiation and not after a delay caused by the interval between the impingement of the beam bundle and the coolant jet as in DE 693 04 194 T2. Consequently, the zone of the occurring compressive stresses caused by the introduction of energy by laser radiation is narrower than that which can be achieved by a method corresponding to the first reference cited above. Since no time is given for heat conduction, the occurring temperature gradient is also not only more sharply concentrated on the severing line, but is also higher. The precision of the cut edges that can be achieved is therefore improved, which is especially significant when cutting into very small pieces.

A method according to WO 03/018276 is disadvantageous in that it also compulsorily requires a liquid coolant. Compared to a severing method in which material is removed by means of laser, a severing method based on the introduction of thermal stresses has the advantage that basically no waste products occur so that there is no soiling of the workpiece surface. Naturally, this advantage is neutralized when a liquid coolant comes into contact with the workpiece surface as in the two methods described above.

In terms of apparatus, not only are technical means required in addition to apply, hold and remove the coolant film, but means are also required for generating and guiding a flow of gas over the workpiece.

Compared to a method according to DE 693 04 194 T2, a method according to WO 03/018276 also has the disadvantage that the tensile stresses and the compressive stresses only form at the surface and therefore the severing crack frequently terminates as a blind crack in the volume of the material.

OBJECT AND SUMMARY OF THE INVENTION

It is the primary object of the invention to find a severing method based on the principle of inducing thermal stresses by laser in which the disk 1 to be severed does not come into contact with a liquid coolant and severing edges can be cut with great precision.

This object is met for a method in accordance with the invention for severing a disk of brittle material comprising the steps of forming a crack by introducing thermomechanical stresses by a laser, which crack extends from the upper side of the disk at least into the disk toward the underside and in direction of the desired severing lines, fixing the disk by its underside to a supporting surface of a workpiece holder, moving a laser beam on the upper side or free surface of the disk along the desired severing lines relative to the disk, cooling the disk along the desired severing lines and carrying out the cooling from the underside of the disk before the application of the laser beam in that the supporting surface of the workpiece holder is cooled and the cooling persists until the disk is cooled over its thickness.

The above-stated object is met for an apparatus according to the invention for severing a disk of brittle material comprising a laser which directs a laser beam to an upper side of the disk, a workpiece holder having a supporting surface on which the disk is placed and fixed by its underside, a movement device for the relative movement of the laser beam along planned severing lines on the surface of the disk and means for cooling the supporting surfaces being provided in the workplace holder.

It is essential to the invention that the temperature gradient required for severing a disk 1 and the stresses connected therewith are provided in that the disk 1 is initially cooled at least along the desired severing lines proceeding from its underside before a laser beam 5 is applied along the severing lines on the top side of the disk 1 as is known from the prior art. First, tensile stresses are generated at least along the severing lines across the entire thickness of the material and then compressive stresses are generated at the surface of the material.

The heating of the material surface or, more exactly, of the top side of the disk 1 along the desired severing lines can be carried out so as to be very narrowly localized on the severing lines with beam widths known, e.g., from DE 693 04 194 T2.

As a result of the time delay between the laser beam and coolant jet in DE 693 04 194 T2 caused by a minimum distance between the laser beam and coolant jet, the heating zone expands not only over the depth of the disk but also over its width due to the heat conduction and, secondly, the temperature decreases again along the severing line. However, in the method according to the invention there is no time delay between the introduction of heat and the removal of heat. Therefore, a very high temperature gradient can be generated and, depending on the beam width of the laser beam 5, can be localized very narrowly on the severing lines. The method can be applied in an advantageous manner particularly for very thin disks 1, e.g., sapphire wafers, which can be cooled very quickly to the desired cooling temperature along the severing lines and in which the distances between cuts are very small.

The cooling of the underside of the disk 1 which is supported on the supporting surface 2 of the workpiece holder 3 takes place by means of heat conduction between the underside and the cooled supporting surface 2 so that there is no need to remove heat through convection by means of a liquid coolant such as is known from DE 693 04 194 T2 and WO 03/018276, and the disk 1 therefore does not come into direct contact with a cooling liquid 8.

For technical reasons having to do with the subsequent separation of the chip, the disk 1 can be glued to a stretch foil 4 so that the disk 1 is placed on the cooled supporting surface 2 with the intermediary of the stretch foil 4. This supporting surface 2 should be as thin as possible without impairing its actual function and should have excellent heat conductivity.

The disk 1 and stretch foil 4 can be fixed on the supporting surface 2 by a material engagement, positive engagement or frictional engagement. Two possibilities for fixation which are advantageous in connection with a method according to the invention and an apparatus according to the invention will be specified in the following.

Whether the disk 1 should be cooled over the entire surface that is supported on the supporting surface 2, i.e., the entire volume of the disk 1 is cooled, or whether the disk 1 should be cooled only along the desired severing line over the thickness of the disk depends essentially on the energy to be applied, the cooling period, and the technical limitations of a partial cooling of severing lines lying very close together.

When the cooling advantageously also takes place during the application of the laser beam 5, the temperature gradient that is created by a locally defined heat removal is also not reduced again by heat conduction within the disk 1, so that cooling which is strictly confined to the severing lines is sufficient for implementing the method.

However, cooling the entire disk volume has the advantage that the temperature of the disk 1 can be detected by means of a contacting or noncontacting temperature gauge in order to regulate the cooling in such a way that a process temperature can be adjusted which can always be identically reproduced when processing the disks 1.

Temperature detection in areas which are only partially cooled is difficult in practice, particularly in view of the geometric dimensions of the disk 1.

A surface cooling or a locally confined partial cooling can also be preceded by cooling over the entire surface, e.g. by means of circulating gases. This can reduce the actual active process time during which the disk 1 lies on the supporting surface 2, particularly for thicker disks 1 in which a uniform cooling over the thickness of the disk proceeds relatively slowly because of the poor thermal conductivity of the brittle material. To this end, the disks 1 can be held in a cooled storage prior to the severing process or can be supplied to the workpiece holder 3 via a cooling antechamber.

The invention will be explained more fully in the following with reference to embodiment examples shown in the drawing.

DESCRIPTION OF THE PREFERRED EMBODIMENTS

Figure 1:
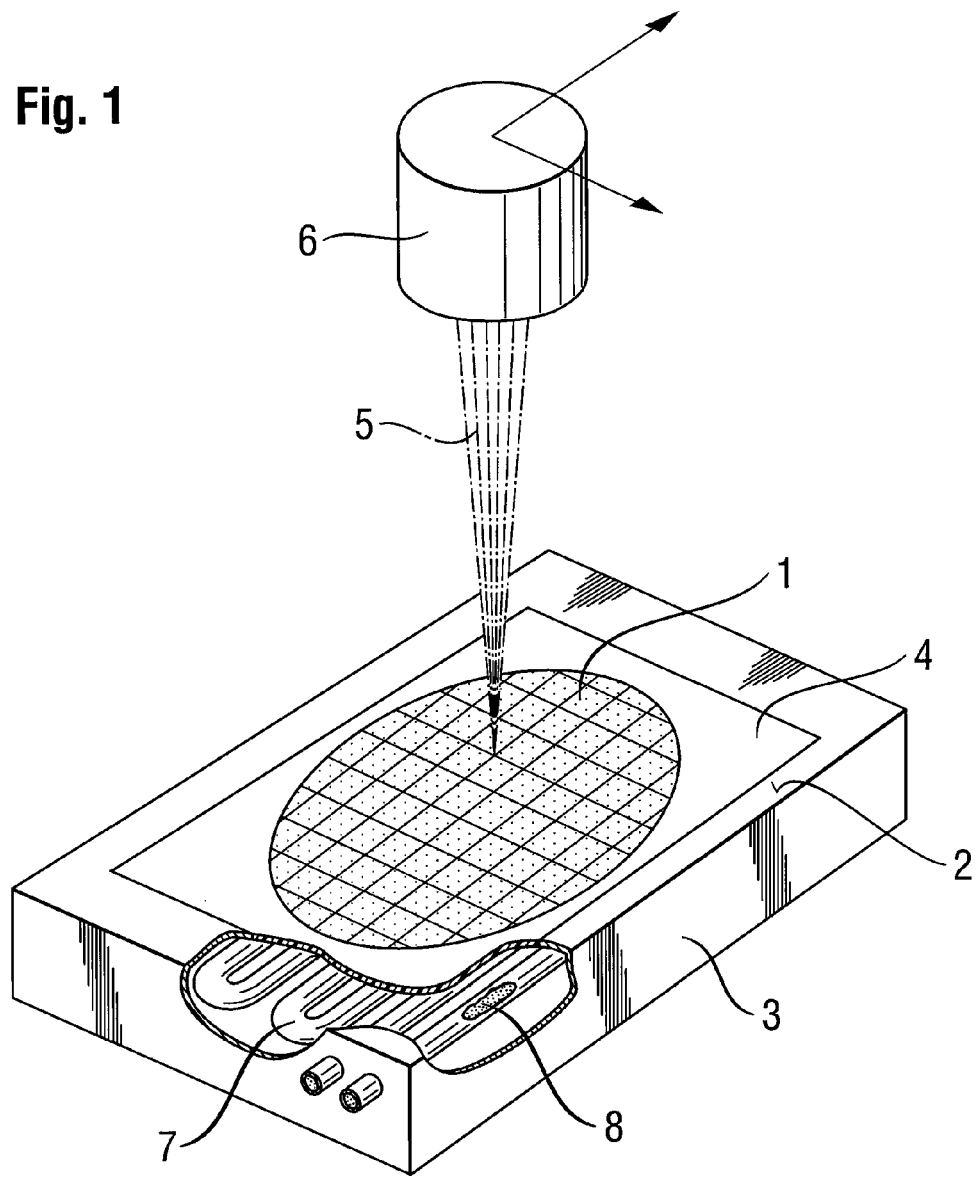
FIG. 1 shows an apparatus according to the invention with its essential components.

In a first embodiment example, a disk 1 which in this case is a sapphire wafer which is outfitted with components on one side and has a thickness of 90 μm and a diameter of 2" is separated into individual parts (chips), e.g., with an edge length of 280 μm×280 μm. This means that the grid of planned severing lines has two groups of straight severing lines arranged in the trenches, as they are called, and extending at a distance of only 280 μm relative to one another, these groups being arranged so as to be rotated by 90° relative to one another.

Before the sapphire wafer 1 is placed on a supporting surface 2 of a workpiece holder 3, it is glued to a stretch foil 4 by its component side. The stretch foil 4 serves to hold together the chips that have been singularized after the severing process before they are spatially separated from one another by stretching the stretch foil 4 and subsequently removed.

After the stretch foil 4 which is glued to the sapphire wafer is placed on the supporting surface 2 of the workpiece holder 3, the stretch foil 4 is fixed. In the first embodiment example, this is carried out by frictional engagement in that the stretch foil 4 is sucked to the supporting surface 2. For this purpose, the supporting surface 2 is made of a porous material preferably having high thermal conductivity. Instead of a porous material, openings can also be provided in the supporting surface 2 between the trenches for suction, particularly when the trenches have a larger trench spacing, e.g., in silicon wafers and conventional chip sizes of 3 to 10 mm. A vacuum is generated below the porous material or supporting surface 2 provided with openings so that the stretch foil 4 is pulled through the pores or openings onto the supporting surface 2. The suction not only fixates the disk 1 but also pulls it into a plane, which is advantageous for highly precise severing.

The cooling of the supporting surface 2 can be carried out in many different ways known to the person skilled in the art. For example, liquid or gaseous coolant 8 can be guided under the supporting surface 2, or the supporting surface 2 is cooled by Peltier elements. Depending on whether or not the supporting surface 2 is cooled homogeneously or in a grid pattern corresponding to the severing line grid, the disk 1 that is placed on it is cooled homogeneously or only along the trenches in which severing lines are provided.

The temperature of the disk 1 is advantageously monitored at its upper side, e.g., by means of an infrared sensor. As soon as the temperature has fallen to a predetermined temperature, the actual severing process begins in that the laser beam 5 is directed to the upper side. Usually, all of the severing lines in one direction are lasered first before the laser beam 5 passes over the rest of the severing lines after the disk 1 has been rotated. The temperature of the disk 1 is maintained during the actual severing process.

When no temperature sensor is provided, cooling is carried out over a determined time which is determined beforehand as an optimal cooling time through practical trials.

In a second embodiment example, the disk 1 is a silicon wafer with a diameter of 300 mm and a thickness of 200 µm. The silicon wafer is cut into chips with an edge length of 10×10 mm.

The fixation and cooling of the silicon wafer is carried out in this instance by a material engagement by freezing the underside of the wafer to the supporting surface 2 of the workpiece holder 3. To this end, slits are provided in the supporting surface 2 in a grid identical to the planned severing lines and are filled with a liquid, e.g., water. After the silicon wafer has been glued to a stretch foil 4, the stretch foil 4 is placed on the supporting surface 2 in such a way that the trenches of the wafer come into contact with the slits and the stretch foil 4 in these areas contacts the water. The water is brought to freezing so that the stretch foil 4 freezes on and is accordingly fixed. The entire supporting surface 2 can also be coated by a liquid film which hardens after placement of the stretch foil 4 outfitted with a disk 1.

Also, the wafer in this embodiment example is cooled until it has reached the desired temperature at least along the severing lies on its surface. Further cooling serves not to reduce the temperature but rather to maintain the reduced temperature. The optimal temperature for achieving a sufficiently high temperature gradient depends particularly on the wafer material and the process parameters of the laser 6.

To keep the actual work process starting with the supporting of the disk 1 on the supporting surface 2 as brief as possible, the disk 1 can already be cooled before placing it on. For this purpose, the disk 1 can be stored in a cooling chamber or transported through a cooled zone on the way to the workpiece holder 3.

Similar to like devices known from the prior art, an apparatus according to the invention has at least a laser 6, a workpiece holder 3 on which the workpiece, in this case a disk 1, is held, and a movement device by which the laser beam 5 is moved relative to the disk 1.

The difference over the prior art consists particularly in that the disk 1 is not only fixed to the workpiece holder 3, but is also cooled along its supporting surface 2 before and advantageously during the process.

Cooling channels 7, through which a liquid or gaseous coolant 8 flows, can be formed under the supporting surface 2 for cooling. In order to cool the supporting surface 2 as homogeneously as possible, the cooling channels 7 are placed as close together as possible. For partial cooling only along the planned severing lines, the cooling channels 7 can be formed in a grid identical to the grid of the planned severing lines.

The supporting surface 2 itself can also be formed by the cooling channels 7. In this case, the disk 1 can be sucked onto the supporting surface 2, as was described in the description of the implementation of the method, through the intermediate spaces formed between the cooling channels 7.

Instead of closed cooling channels 7 under or inside the supporting surface 2, the supporting surface 2 can also have a plurality of grooves which are arranged in a grid identical to the severing line grid. These grooves are filled with a cooling liquid 8 which is cooled below the freezing point so that it holds the stretch foil 4 placed on it by material engagement and cools the disk 1 at the same time.

As has already been mentioned several times, the stretch foil 4 is needed particularly to hold the wafer in position during and after separating into individual chips. The stretch foil 4 is advantageous for the method according to the invention insofar as it can be held by suction and, when held in an alternative manner by freezing, the cooling liquid 8 to be frozen does not come into contact with the wafer. But the presence of a stretch foil 4 between the underside of the disk 1 and the supporting surface 2 of the workpiece holder 3 is not compulsory for the success of the method.

While the foregoing description and drawings represent the present invention, it will be obvious to those skilled in the art that various changes may be made therein without departing from the true spirit and scope of the present invention.

REFERENCE NUMBERS 1 disk
2 supporting surface
3 workpiece holder
4 stretch foil
5 laser beam
6 laser

What is claimed is:

1. A method for severing a disk of brittle material comprising the steps of:
    forming a crack by introducing thermomechanical stresses by a laser, which crack extends from the upper side of the disk at least into the disk toward the underside and in direction of the desired severing lines;
    fixing the disk by its underside to a supporting surface of a workpiece holder;
    moving a laser beam on the upper side or free surface of the disk along the desired severing lines relative to the disk;
    cooling the disk along the desired severing lines; and
    carrying out the cooling from the underside of the disk before the application of the laser beam in that the supporting surface of the workpiece holder is cooled and the cooling persists at least until the disk is cooled over its thickness;
    wherein the cooling is carried out by a means for cooling being provided in the workpiece holder;
    wherein said means for cooling are cooling channels or grooves through which liquid or gaseous coolant flows and which are arranged under the supporting surface; and
    wherein said cooling channels are arranged in a pattern identical to a pattern of the planned severing lines, so that the cooling is localized in a narrowly confined manner along the desired severing lines.

2. The method according to claim 1;
    wherein the cooling is carried out over the entire surface.

3. The method according to claim 1;
    wherein the disk is fixed indirectly to the supporting surface.

4. The method according to claim 1;
    wherein the disk is fixed directly to the supporting surface.

5. The method according to claim 3;
wherein the disk is placed on the supporting surface so as to adhere to a stretch foil.

6. The method according to claim 1;
wherein the disk is held by suction.

7. The method according to claim 1;
wherein the disk is held by frozen liquid.

8. The method according to claim 7;
wherein the liquid forms a film covering the supporting surface.

9. The method according to claim 7;
wherein the liquid is located inside the supporting surface in grooves with a grid corresponding to the desired severing lines.

10. The method according to claim 1;
wherein the cooling is continued during the application of the laser beam.

11. The method according to claim 1;
wherein the disk is cooled before placing it on the workpiece holder.

12. The method according to claim 11;
wherein said means are provided for generating a vacuum in the workpiece holder, and a disk supported on the supporting surface is sucked on through the spaces remaining between channels.

13. An apparatus for severing a disk of brittle material comprising:
 a laser which directs a laser beam to an upper side of the disk;
 a workpiece holder having a supporting surface on which the disk is placed and fixed by its underside;
 a movement device for the relative movement of the laser beam along planned severing lines on the surface of the disk; and
 means for cooling the supporting surface being provided in the workpiece holder;
 wherein said means for cooling are cooling channels through which liquid or gaseous coolant flows and which are arranged under the supporting surface; and
 wherein said cooling channels are arranged in a grid identical to the grid of the planned severing lines, so that the cooling is localized in a narrowly confined manner along the desired severing lines.

14. An apparatus for severing a disk of brittle material comprising:
 a laser which directs a laser beam to an upper side of the disk;
 a workpiece holder having a supporting surface on which the disk is placed and fixed by its underside;
 a movement device for the relative movement of the laser beam along planned severing lines on the surface of the disk; and
 means for cooling the supporting surface being provided in the workpiece holder;
 wherein said means for cooling are grooves in the supporting surface which are filled with a frozen liquid and by which the disk is also fixed to the supporting surface, so that the cooling is localized in a narrowly confined manner along the desired severing lines.

* * * * *